United States Patent
Shiu (10) Patent No.: US 6,765,952 B2
(45) Date of Patent: Jul. 20, 2004

(54) TRANSMIT DIVERSITY PILOT PROCESSING

(75) Inventor: Da-shan Shiu, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 208 days.

(21) Appl. No.: 10/139,904

(22) Filed: May 6, 2002

(65) Prior Publication Data

US 2003/0206601 A1 Nov. 6, 2003

(51) Int. Cl.[7] .............................. H04L 1/00; H04L 1/02
(52) U.S. Cl. ...................................... 375/147; 375/267
(58) Field of Search ................................ 375/141–148, 375/267, 239, 340

(56) References Cited

U.S. PATENT DOCUMENTS

| | | | | |
|---|---|---|---|---|
| 5,615,209 A | * | 3/1997 | Bottomley | 370/342 |
| 6,580,750 B2 | * | 6/2003 | Aue | 375/150 |
| 2002/0106008 A1 | * | 8/2002 | Guey | 375/148 |
| 2002/0136158 A1 | * | 9/2002 | Frank | 370/209 |
| 2003/0016640 A1 | * | 1/2003 | Onggosanusi et al. | 370/335 |
| 2003/0031276 A1 | * | 2/2003 | Boariu | 375/340 |
| 2003/0076871 A1 | * | 4/2003 | Abrishamkar et al. | 375/141 |
| 2003/0142726 A1 | * | 7/2003 | Eltawil et al. | 375/146 |

FOREIGN PATENT DOCUMENTS

| | | | | |
|---|---|---|---|---|
| EP | 0993129 | 10/1999 | | H04B/7/06 |
| WO | 0197400 | 12/2001 | | H04B/1/707 |

* cited by examiner

*Primary Examiner*—Stephen Chin
*Assistant Examiner*—Lawrence Williams
(74) *Attorney, Agent, or Firm*—Philip R. Wadsworth; Charles D. Brown; George C. Poppas (57) ABSTRACT

Techniques for improved diversity pilot estimation in rapidly changing channel environments are disclosed. In one aspect, a difference estimate is updated when a current received symbol comprises a difference between the primary and diversity channels, and a sum estimate is updated when a current received symbol comprises a sum of the primary and diversity channels. The primary channel and the diversity channel are estimated in response to the sum estimate and the difference estimate. In another aspect, the sum estimate and difference estimate are produced by filtering the received symbols. In yet another aspect, received symbols are demodulated in response to the primary and diversity channel estimates. These aspects have the benefit of incorporating the most recently received symbol, resulting in more accurate channel estimates and hence improved demodulation performance, increased system capacity, lower required transmit power, and other benefits.

24 Claims, 7 Drawing Sheets

| PRIMARY | A | A | A | A | A | A | A | A | ... |
|---|---|---|---|---|---|---|---|---|---|
| DIVERSITY | A | -A | -A | A | A | -A | -A | A | ... |
| SYMBOL NUMBER | 0 | 1 | 2 | 3 | 4 | 5 | 6 | 7 | ... |

TRANSMIT DIVERSITY PILOT PROCESSING

FIELD

The present invention relates generally to communications, and more specifically to a novel and improved method and apparatus for transmit diversity pilot processing.

BACKGROUND

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

One technique used to enhance performance, including system capacity and data throughput, is to lower the required transmit signal power by employing transmit diversity. Transmit diversity involves transmitting data on two or more antennas, where the geographical separation between the antennas leads to path loss characteristics that are independent from antenna to antenna. Thus, a receiving station can coherently combine signals from the transmit diversity antennas, and the noise introduced in the channel will not combine coherently, thus increasing the signal-to-noise ratio (SNR) received.

To differentiate between the transmitted signals, a different pilot sequence is used for each antenna. In a two-antenna scheme, for example, a primary antenna transmits a primary pilot sequence, and a diversity antenna transmits a diversity pilot sequence. The diversity pilot sequence can be generated by multiplying the primary pilot sequence by an orthogonalizing sequence, so that the primary and diversity pilots are orthogonal.

In order to demodulate each of the transmit diversity signals in a mobile station, an estimate is made of the pilot signals associated with them. One method for pilot estimation, known in the art, takes advantage of the relationship between the primary and diversity pilot just described. Received samples are despread with the primary pilot sequence and accumulated. A buffer stores the previous accumulated symbol. The current and previous accumulated symbols can be added or subtracted at certain symbol boundaries, according to the relationship between the primary and diversity pilots, to yield an estimate of both the primary and diversity pilot symbols. For example, using the pilot sequences defined in the W-CDMA specification, pilot estimates are generated every other symbol. These symbols are used for data demodulation of each symbol, operating under the assumption that during alternating symbols, the pilot estimates are approximately equal to those received during the prior symbol. As such, during every other symbol, the most recently despread pilot symbol is not factored in the channel estimate, and, therefore, not used in data demodulation. This process is detailed further below.

Under certain circumstances, the assumption that sequential pilot symbols are approximately equal is valid, and hence demodulation using prior pilot symbol estimates is sufficient. However, when channel conditions change more rapidly, such as when a mobile station is traveling at high speeds, that assumption may no longer be valid, and demodulation performance may degrade to a point insufficient for the desired communication performance level. There is therefore a need in the art for improved diversity pilot estimation in rapidly changing channel environments.

SUMMARY

Embodiments disclosed herein address the need for improved diversity pilot estimation in rapidly changing channel environments. In one aspect, a difference estimate is updated when a current received symbol comprises a difference between the primary and diversity channels, and a sum estimate is updated when a current received symbol comprises a sum of the primary and diversity channels. The primary channel and the diversity channel are estimated in response to the sum estimate and the difference estimate. In another aspect, the sum estimate and difference estimate are produced by filtering the received symbols. In yet another aspect, received symbols are demodulated in response to the primary and diversity channel estimates. These aspects have the benefit of incorporating the most recently received symbol, resulting in more accurate channel estimates and hence improved demodulation performance, increased system capacity, lower required transmit power, and other benefits.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
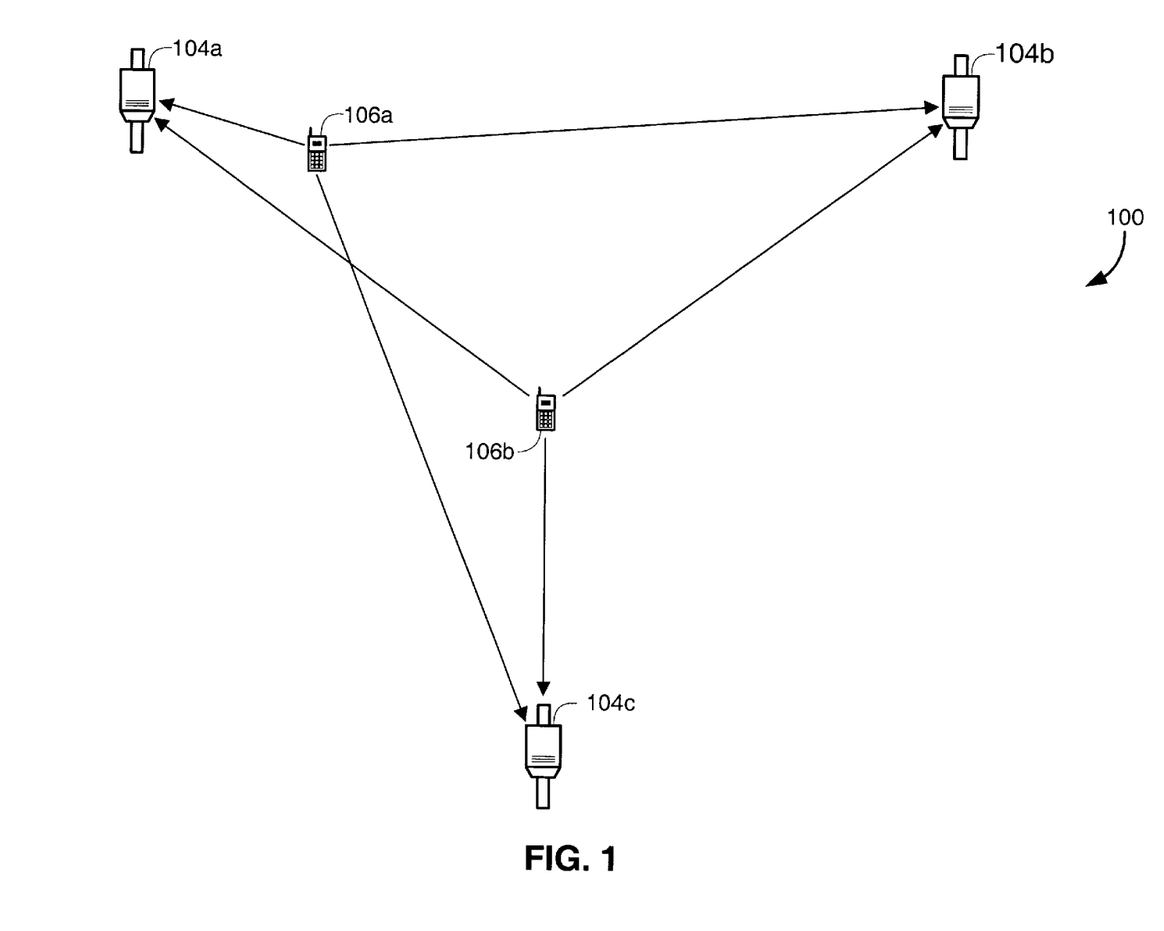
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
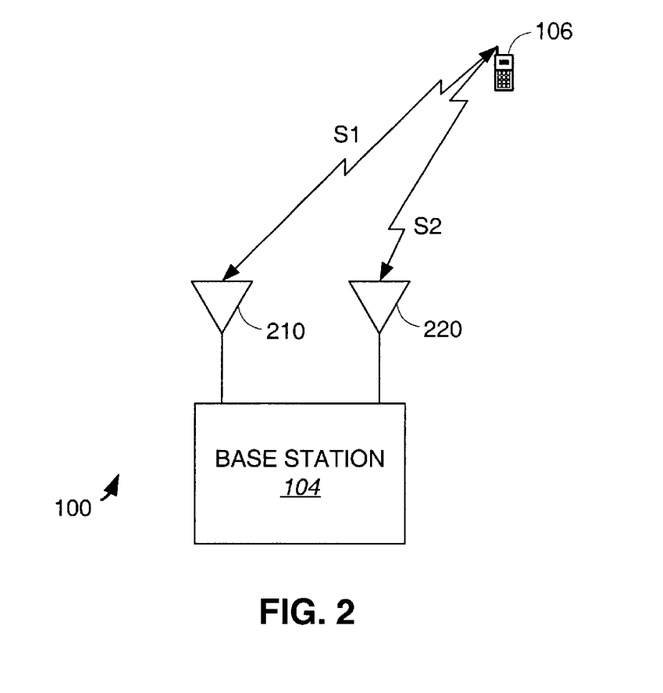
FIG. 2 depicts a portion of a wireless communication system with a base station and mobile station equipped for transmit diversity.

FIG. 2 shows an embodiment of system 100, detailing a transmit diversity scheme. Base station 104 is equipped with two antennas, 210 and 220, for communicating with mobile station 106. (Alternative embodiments may use more than two antennas.) The links between antennas 210 and 220 and mobile station 106 are labeled S1 and S2, respectively. The two antennas are located with enough geographical separation that the fading experienced on S1 is independent from the fading on S2, yet the two signals arrive at mobile station 106 at essentially the same time. Various techniques can be employed such that the two signals can be combined constructively at the mobile station, and in so doing combat some of the deleterious effects that would be introduced if only a single antenna were deployed.

One such scheme, detailed in the above referenced W-CDMA standard, is closed-loop transmit diversity. The phase of a signal, S2, transmitted on diversity antenna 220 is adjusted in relation to the signal, S1, transmitted on primary antenna 210 so that the two signals, S1 and S2, are in-phase and maximally combined when received at mobile station 106. The terms primary and diversity, applied to antennas 210 and 220, respectively, are used only to distinguish the two antennas. Those of skill in the art will recognize that phase adjustment can take place on either antenna (or on multiple antennas).

In an alternate scheme, such as space time transmit diversity (STTD), different data is transmitted on each antenna. The data is transmitted in such a fashion that it can be recombined when received at the mobile station. For example, consider a two-antenna transmit diversity scheme, where the symbols transmitted on the primary antenna (or antenna 1) are received at the mobile with complex gain, $\alpha$, and the symbols transmitted on the diversity antenna (or antenna 2) are received with complex gain $\beta$. The complex gains are functions of the channels through which the two signals propagate.

Consider two adjacent complex data symbols awaiting transmission, d1 and d2. The data to be transmitted is distributed across the two antennas as follows: during one symbol transmission period, d1 is transmitted on antenna 1, and $-d2^*$ (where * represents the conjugate) is transmitted on antenna 2. In the next symbol transmission period, d2 is transmitted on antenna 1 and $d1^*$ is transmitted on antenna 2. The signal received at the mobile station during the first symbol transmission period is r1, where $r1=\alpha d1-\beta d2^*$. The signal received at the mobile station during the second symbol transmission period is r2, where $r2=\alpha d2+\beta d1^*$. If the channel gains, $\alpha$ and $\beta$, are known, then the two equations r1 and r2 are sufficient to recover the data, d1 and d2.

Pilot signals received at the mobile station are proportional to the channel gains, $\alpha$ and $\beta$. The channel gains can be estimated by recovering the two pilot signals, pilot 1 and pilot 2, transmitted on the primary and diversity antennas, respectively. The recovered pilots can be used to demodulate signals transmitted from the respective antennas, described in further detail below. In the exemplary embodiment, pilot signals transmitted on each of the plurality of diversity antennas are orthogonal to one another. This property facilitates recovery of the pilots once they are received at the mobile station and minimizes interference.

Figure 3:
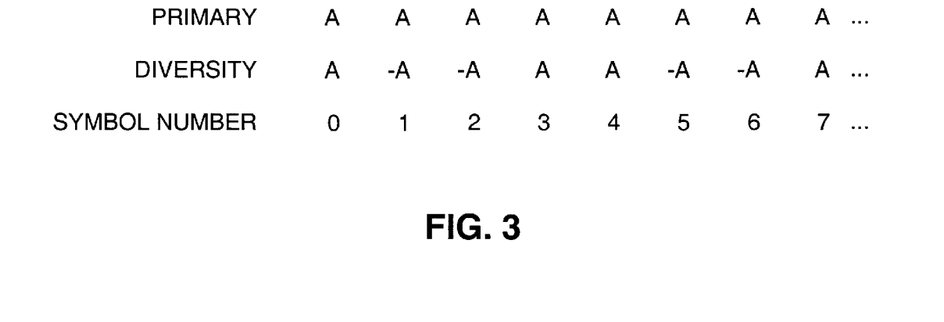
FIG. 3 shows an exemplary relationship between two pilot signals for diversity transmission, as defined by the W-CDMA standard.

One technique for generating orthogonal pilots in a CDMA system is to multiply a first pseudorandom noise (PN) sequence, used for a first pilot signal, by an orthogonalizing signal to produce a second pilot signal. FIG. 3 depicts how an exemplary set of pilot signals can be generated, as described in the W-CDMA standard. In FIG. 3, multiplying a base PN sequence by the value shown corresponding to the symbol number creates the primary and diversity pilots. In this example, the primary pilot is generated by multiplying a base PN sequence by a constant amplitude, A. Multiplying the base PN sequence by A in symbols 0 and 3 generates the diversity pilot, and by –A in symbols 1 and 2. The pattern is repeated for each subsequent set of four symbols (except, as specified for the W-CDMA standard, at frame boundaries). In the exemplary embodiment, each symbol comprises 256 chips. It is readily seen that the resultant primary and diversity pilot sequences are orthogonal to one another. Those of skill in the art will recognize various other orthogonalizing sequences that can be applied to generate orthogonal pilot sequences using a common underlying sequence. Those of skill will further recognize that additional orthogonalizing sequences can be constructed to generate a plurality of orthogonal pilots for transmitting on a plurality of diversity antennas.

Figure 4:
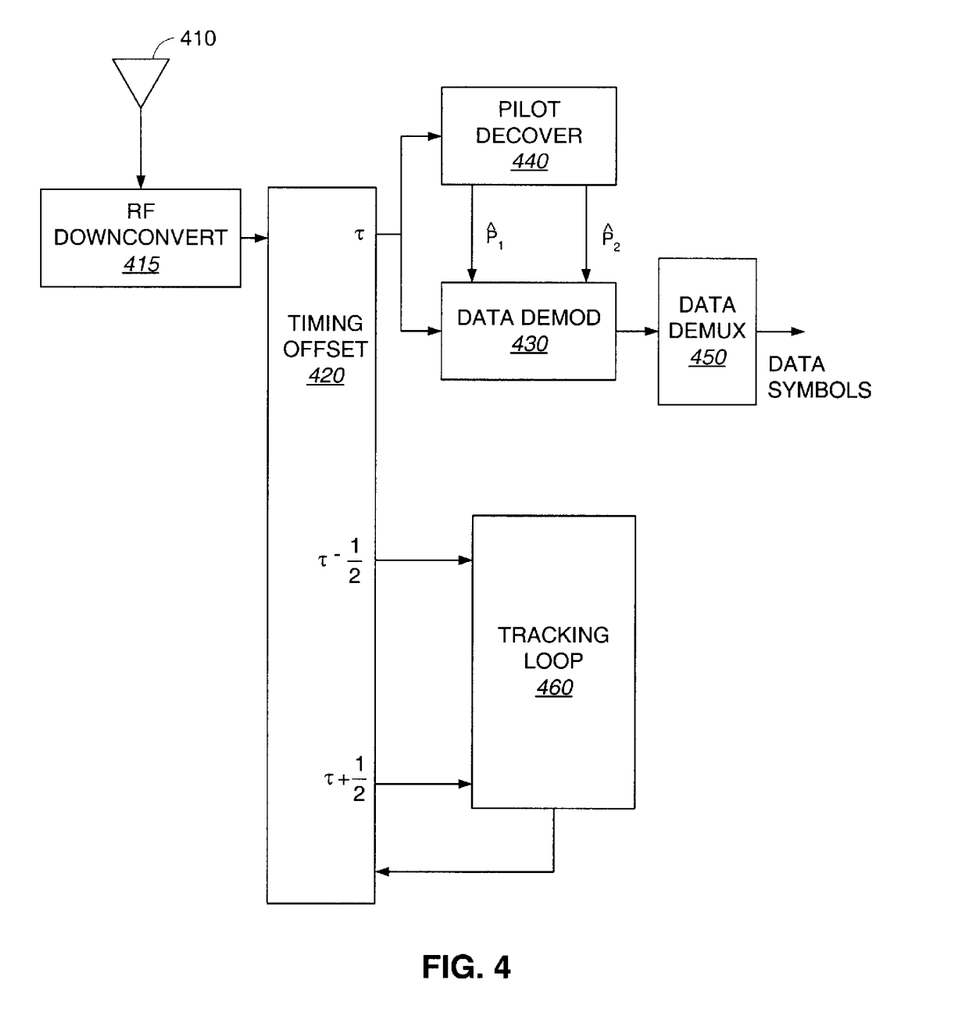
FIG. 4 depicts a portion of a mobile station suitable for transmit diversity pilot processing.

FIG. 4 depicts a portion of a mobile station suitable for transmit diversity pilot processing. Signals are received at antenna 410 and delivered for conversion to baseband in RF downconvert 415, using techniques known in the art. Baseband samples are delivered to timing offset 420, where on-time, early, and late streams of samples are generated corresponding to timing offsets in the incoming signal of τ, τ−½, and τ+½, respectively. The early sequences are sampled prior to a timing reference, and the late sequences are sampled subsequent to that timing reference. It is common to sample the early and late sequences one half chip from the timing reference, but other differences can also be used.

The early and late sequences are delivered to tracking loop 460. To maximize received energy and minimize errors, time tracking is performed to minimize phase differences between the pilot signals used for demodulation and the signals being demodulated. Various time tracking techniques are known in the art. Techniques for time tracking in a transmit diversity system include methods for tracking signals from the plurality of antennas independently, as well as methods for tracking a weighted average of the signals from the various antennas with a single tracking loop. These methods are described in co-pending U.S. patent application Ser. No. 09/964,589, entitled "TIME TRACKING IN A NON-NEGLIGIBLE MULTIPATH SPACING ENVIRONMENT", filed Sep. 25, 2001, and U.S. patent application Ser. No. 10/061,873, entitled TIME TRACKING LOOP FOR DIVERSITY PILOTS", filed Jan. 31, 2002, both assigned to the assignee of the present invention. One class of techniques compares the energy in the early and late sequences and adjusts the timing reference, τ, accordingly.

Data demodulator 430 is used to demodulate the on-time sequence from timing offset 420, the timing of which is directed by the output of tracking loop 460. On-time samples are also used in pilot decover 440 to produce estimates of the primary and diversity pilots, $\hat{P}_1$ and $\hat{P}_2$, which are used to demodulate data in data demodulator 430. Data demodulator 430 produces data corresponding to the data received from the primary and diversity antennas. If needed, data demux 450 can be deployed to de-multiplex the two antenna data streams to produce the output data symbols.

The following discussion will use the primary and diversity pilot sequences defined in the W-CDMA standard as an example. Those of skill in the art will be able to apply these principles to other pilot sequences. The relationship between the primary and diversity sequences is shown in FIG. 3, as described above. In W-CDMA, a downlink Common Pilot Channel (CPICH) can be used as a channel condition reference in the demodulation process. When transmit diversity is not deployed, the CPICH is a fixed rate (30 kbps, spreading factor=256) downlink channel that carries a predefined bit/symbol sequence. Specifically, the CPICH is the primary scrambling code of the cell, spread by the all zero sequence. Thus, the CPICH is the scrambling code multiplied by 1+j. To simplify the following equations, A=1+j.

When transmit diversity is used on the downlink channel, the CPICH is transmitted from both antennas, as described with respect to the non-diversity case above. In addition, in order to distinguish the primary and diversity channels, the data transmitted on the diversity antenna is modulated by a specific pattern. The kth symbol in a radio frame, denoted $s_k$, is given in equation 1:

$$s_k = (-1)^{f_k} \cdot A \qquad \text{Equation 1}$$

where $f_k$ is given by equation 2:

$$f_k = k \bmod 2 + \left\lfloor \frac{k}{2} \right\rfloor \bmod 2 \qquad \text{Equation 2}$$

The sequence produced by equations 1 and 2 is the diversity pilot sequence depicted in FIG. 3. Note that in the W-CDMA embodiment, each radio frame comprises 150 symbols, so k falls increments within the range of 0 . . . 149, then repeats. The principles of the present invention apply to any number of symbols in a radio frame, and $f_k$ can be modified to produce any sequence $s_k$. In general, $s_k$ may be designed so that the primary and diversity pilots are orthogonal over some number of symbols. In this example, the primary and diversity pilots are orthogonal over two symbols. Those of skill in the art will recognize the myriad combinations of primary and diversity pilot sequences, with myriad lengths of symbols over which the two pilots are orthogonal. All of these combinations fall within the scope of the present invention.

The symbol received at the mobile station at time k, $r_k$, is given by equation 3:

$$r_k = \alpha_k A + (-1)^{f_k} \beta_k A + n_k \qquad \text{Equation 3}$$

where $\alpha_k$ and $\beta_k$ are the complex-valued channel gains from the primary and diversity antennas, respectively, and $n_k$ is the additive noise. An estimate of $\alpha_k$ and $\beta_k$ is made for use in the demodulation process. In other words, $\hat{P}_1$ and $\hat{P}_2$, calculated in pilot decover 440, can be estimated from $\alpha_k$ and $\beta_k$, techniques for which will be recognized by those of skill in the art.

To understand the limitations of the prior techniques for estimating channel gains, consider first the case without transmit diversity. In this case, a single complex-valued channel gain, $\alpha_k$, represents the transmission channel. The received symbol at the mobile station, at time k, is given by equation 4:

$$r_k = \alpha_k A + n_k \qquad \text{Equation 4}$$

A reliable approximation of $\alpha_k$ can be formed from received symbols, an example of which is given in Equation 5:

$$\alpha_k = h_1(r_k, r_{k-1}, \ldots) \qquad \text{Equation 5}$$

where $h_1$ can be any filter.

The approximation, $\alpha_k$, is formed using symbols received at time k and earlier, and can be used to demodulate incoming data symbols at time k. To do so may require the data symbols to be buffered, since $r_k$ will need to be received prior to calculating $\alpha_k$. In general, such buffering may require additional storage resources, and may introduce delay in the demodulation process. To avoid buffering, the channel estimates at time k can be used to demodulate symbols received at time k+1. The principles of the present invention apply with equal force regardless of whether buffering is used. For clarity, in this discussion, the buffered demodulation case will be described, that is, where channel estimates based on received symbols at times k and earlier are used to demodulate data received at time k.

When transmit diversity is deployed, prior implementations have relied on the assumption that $\alpha_k$ is approximately equal to $\alpha_{k+1}$, and that $\beta_k$ is approximately equal to $\beta_{k+1}$. Therefore, pilot estimates can be approximated as given in equations 6 and 7:

$$\tilde{\alpha}_{2l} \approx \tilde{\alpha}_{2l-1} = h_2\left(\frac{r_{2l-2} + r_{2l-1}}{2}, \frac{r_{2l-4} + r_{2l-3}}{2}, \ldots\right) \quad \text{Equation 6}$$

$$\tilde{\beta}_{2l} \approx \tilde{\beta}_{2l-1} = h_2\left(\frac{(-1)^{f_{2l-2}} r_{2l-2} + (-1)^{f_{2l-1}} r_{2l-1}}{2},\right.$$

$$\left.\frac{(-1)^{f_{2l-4}} r_{2l-4} + (-1)^{f_{2l-3}} r_{2l-3}}{2}, \ldots\right) \quad \text{Equation 7}$$

where $h_2$ can be any filter, and 1 is an integer. Thus, $\alpha_2 \approx \alpha_1$, $\alpha_4 \approx \alpha_3$, $\alpha_6 \approx \alpha_5$, and so forth. Likewise, $\beta_2 \approx \beta_1$, $\beta_4 \approx \beta_3$, $\beta_6 \approx \beta_5$, and so forth.

Comparing equation 5 with equations 6 and 7, notice that every other set of estimates for the transmit diversity case does not factor in the most recently received symbol. Specifically, $\alpha_{21}$ and $\beta_{21}$ do not make use of the most recently received symbol, $r_{21}$. In certain circumstances, such as when a mobile station is traveling at high speed, leaving out the most recently received symbol can lead to large estimation errors in the channel estimates, and thus the pilot estimates, $\hat{P}_1$ and $\hat{P}_2$, significantly degrading demodulation performance.

Figure 5:
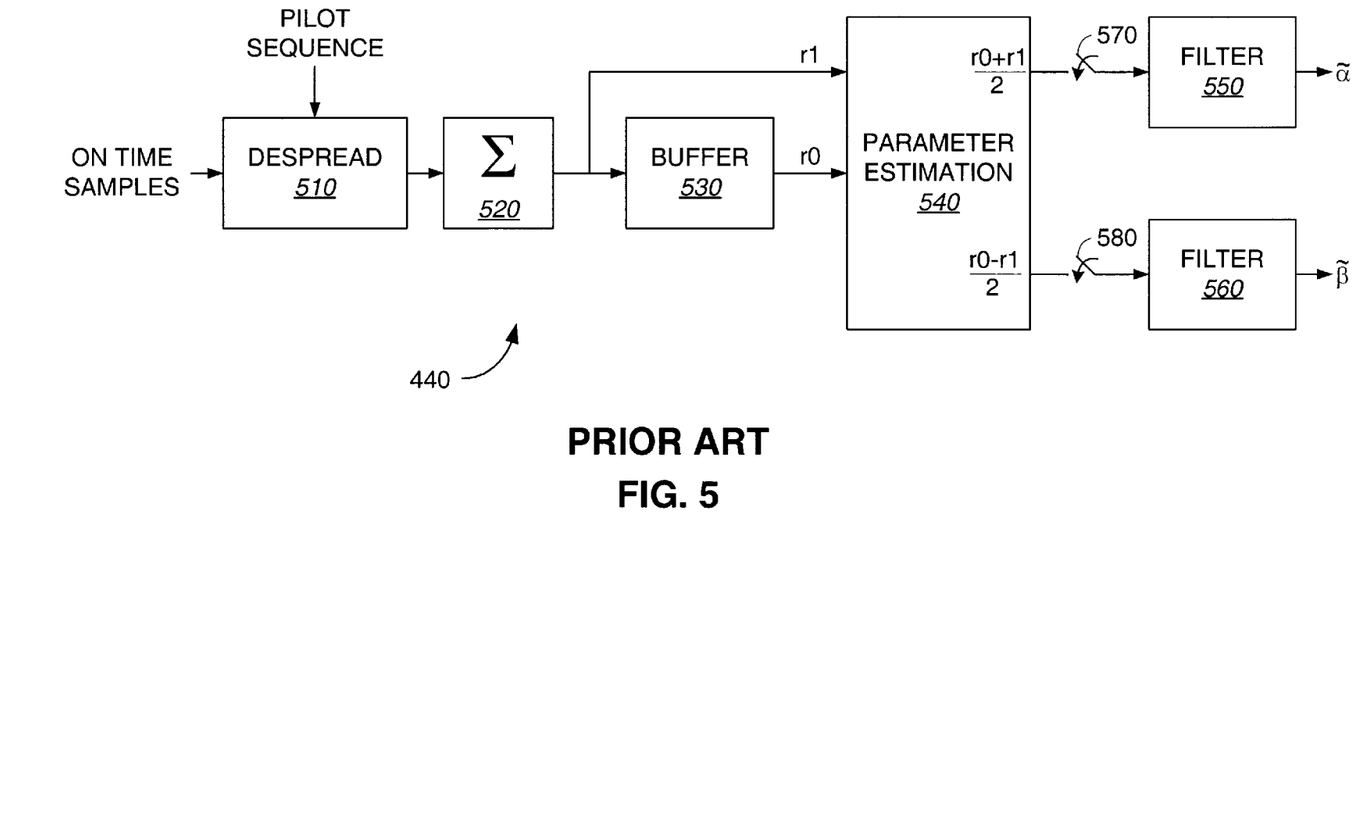
FIG. 5 depicts a prior art implementation of pilot decover block.

FIG. 5 depicts a prior art implementation of pilot decover 440. The incoming on-time symbol is despread in despreader 510 using the primary pilot sequence and accumulated in accumulator 520 to produce symbol $r_1$. A buffer 530 stores the previous accumulated symbol, denoted $r_0$, as well.

The current and previous symbols, $r_0$ and $r_1$, can be added or subtracted to yield an estimate of both the primary and diversity pilot symbols. Recall that during each symbol interval k, the mobile station receives a combination of the signals, transmitted from the primary and diversity antenna, with complex gains $\alpha_k$ and $\beta_k$ corresponding to the respective channels. In symbol 0, $(\alpha_k+\beta_k)A$ is received. In symbol 1, $(\alpha_k-\beta_k)A$ is received. In symbol 2, $(\alpha_k-\beta_k)A$ is received. In symbol 3, $(\alpha_k+\beta_k)A$ is received. And the pattern repeats. Adding symbol 0 to symbol 1 yields $2(\alpha_k)(A)$, which is proportional to $\alpha_k$, and can be used for estimating $\hat{P}_1$. Subtracting symbol 1 from symbol 0 yields $2(\beta_k)(A)$, which is proportional to $\beta_k$, and can be used for estimating $\hat{P}_2$. Symbols 2 and 3 add to produce $2(\alpha_k)(A)$, which is proportional to $\alpha_k$, and can be used for estimating $\hat{P}_1$. The difference between symbols 2 and 3 is $2(\beta_k)(A)$, which is proportional to $\beta_k$, and can be used for estimating $\hat{P}_2$. This process can be repeated, calculating pilot estimates every other symbol, using the estimates for data demodulation. This process is carried out in parameter estimation block 540, which receives $r_0$ and $r_1$ and produces outputs $(r_0+r_1)/2$ and $(r_0-r_1)/2$. Switches 570 and 580 direct these two outputs into filters 550 and 560, respectively, every other symbol. The filters 550 and 560 can be used to average out the noise factor, $n_k$, as well as to produce estimates based on prior symbols, as given in equations 6 and 7 above. The output of filters 550 and 560 are, respectively, the estimates of $\alpha_k$ and $\beta_k$.

For example, consider filters 550 and 560 which use a one-pole Infinite Impulse Response (IIR) filter for each. For brevity, only the generation of α is described. The generation of β is similar. The estimates of α are determined according to equation 8:

$$\tilde{\alpha}_{2l} \approx \tilde{\alpha}_{2l-1} = (1-a)\tilde{\alpha}_{2l-3} + a\left(\frac{r_{2l-1} + r_{2l-2}}{2}\right) \quad \text{Equation 8}$$

where a is the IRR coefficient, and 1 is an integer. Using this example, it can be seen that when k is even, the estimate of α is the same as the prior estimate, so the most recent symbol is not included. The effects of this are summarized in Table 1.

TABLE 1

| k | Symbols Used | Symbol Ages | Average Age |
|---|---|---|---|
| 1 | r0, r1 | 1, 0 | 0.5 |
| 2 | r0, r1 | 2, 1 | 1.5 |
| 3 | r2, r3 | 1, 0 | 0.5 |
| 4 | r2, r3 | 2, 1 | 1.5 |
| 5 | r4, r5 | 1, 0 | 0.5 |
| ... | ... | ... | ... |

The first column in Table 1 shows the symbol index, k. The second column indicates which two recent received symbols are included in the filter calculation. Column three indicates the ages, in number of symbols, of the two most recent symbols. Column four shows the average age of the two most recent symbols. Those of skill in the art will recognize that the accuracy of the estimates can be increased with decreasing average age of the symbols used in the estimation. These prior art age calculations will be compared with those for an embodiment of the present invention using similar IIR filters, described below.

In contrast with the prior art described above with respect to FIG. 5, embodiments disclosed herein incorporate the most recently received symbol in each channel parameter estimate. The principle is that each symbol is proportionate to either the sum or difference of alpha and beta. Rather than wait for successive symbols to arrive that can be manipulated to find the estimates, which means a delay of one symbol in a W-CDMA system (other systems could use orthogonalizing sequences that introduce additional delay requirements), a difference term and a sum term are estimated. Either the difference term or the sum term will be updated every symbol. The difference and sum terms may be filtered to provide more stable estimates. The α and β are then estimated from the difference and sum estimates, incorporating information included in the most recently received symbol.

Figure 6:
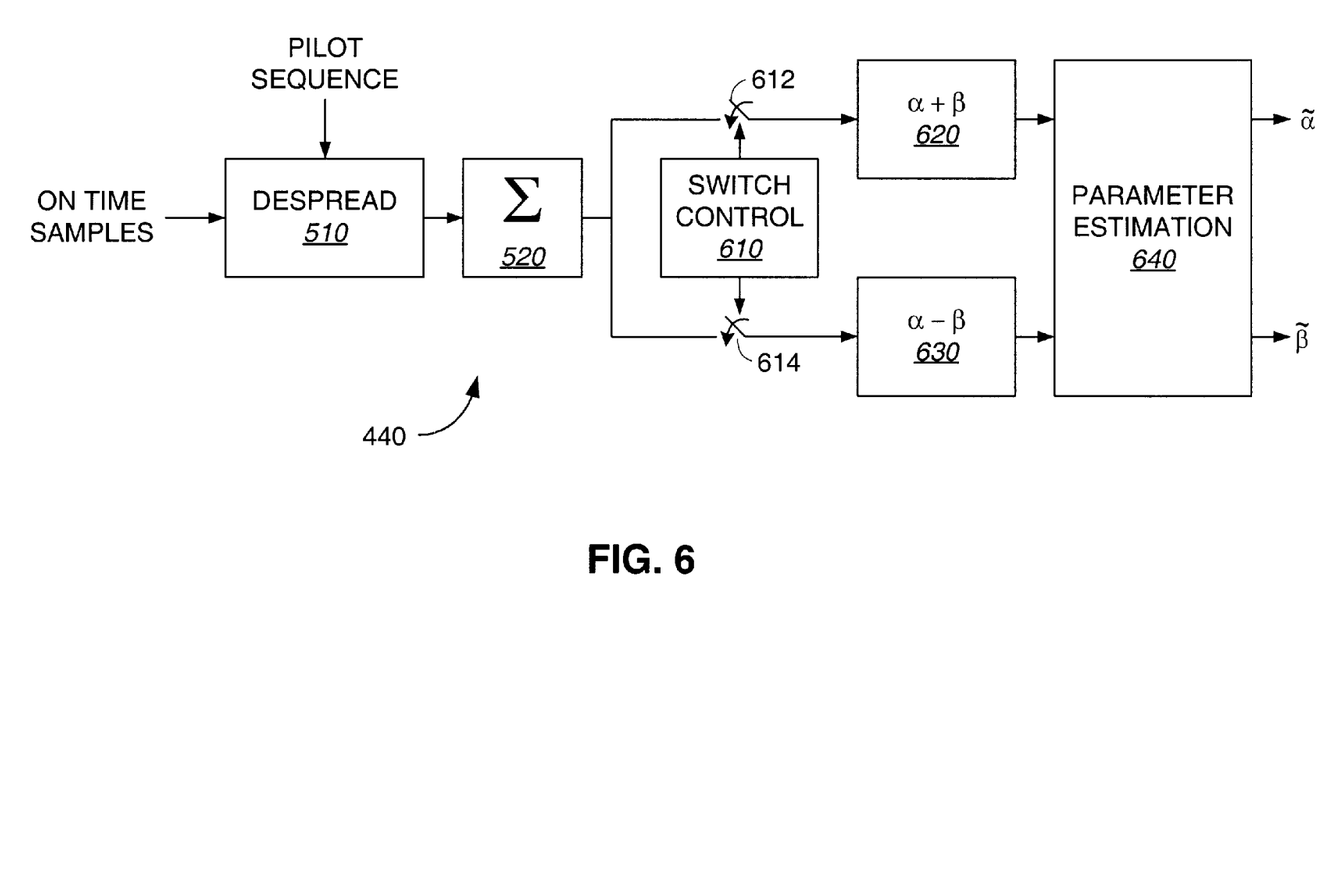
FIG. 6 depicts an embodiment of an improved pilot decover block.

FIG. 6 depicts an embodiment of a pilot decover 440 which alleviates the symbol age issues described earlier. As in FIG. 5, on time samples are despread and accumulated in despreader 510 and accumulator 520. Then, switch control 610 is used to control switches 612 and 614 to introduce the symbol accumulated in accumulator 520 to either α+β estimate 620 or α−β estimate 630, respectively. The most recent accumulated symbol is always used to update one estimate or the other. Parameter estimation block 640 receives the estimates of α+β and α−β and produces the estimates of $\alpha_k$ and $\beta_k$, α and β, respectively.

The timing of switches 612 and 614, as controlled by switch control 610, will vary according to the relationship between the pilot signals on the primary and diversity antennas, and those of skill in the art will readily adapt switch control 610 to any system. For the exemplary W-CDMA embodiment, switch 612 is activated whenever the received symbol is the sum of the primary and diversity pilots, which occurs whenever $f_k$ is even. Switch 614 can be activated whenever switch 612 is not activated, or whenever $f_k$ is odd.

Figure 7:
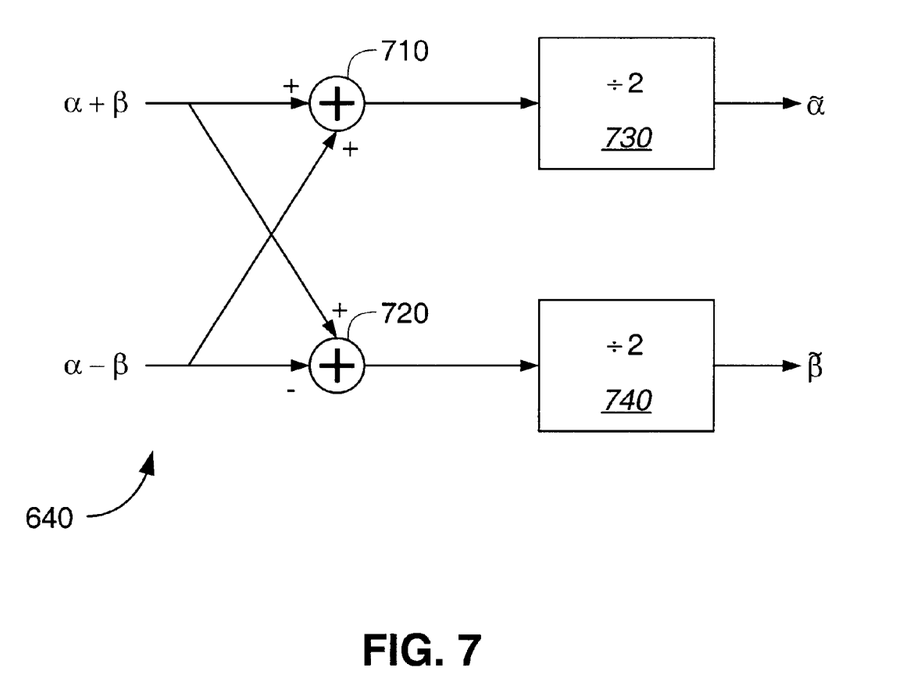
FIG. 7 depicts an embodiment of an exemplary parameter estimation block.

FIG. 7 depicts an embodiment of parameter estimation block 640. The estimate of α+β is summed with the estimate of α−β in summer 710 to produce 2α, then divided by two in divider 730 to produce α. Those of skill in the art will recognize that divider 730 can be performed using a variety of techniques, including a simple shift operation. Furthermore, those of skill in the art will recognize that, in some embodiments, no division is necessary since 2α is proportional to α and the factor of two can be accounted for in subsequent pilot processing. Similarly, α−β is subtracted from α+β in summer 720 to produce 2β, which can be divided in divider 740. Divider 740 is optional, for the reasons just described, and can be deployed using any of the division techniques, including shifting, that are known in the art.

The implementation of α+β estimate 620 or α−β estimate 630 can comprise a filter of any type. One example is the IIR filter similar to that described above in equation 8. In this example, filters 620 and 630 are given by equations 9 and 10, respectively:

$$(\alpha+\beta)_k = (1-a)(\alpha+\beta)_{k-1} + ar_k \quad \text{Equation 9}$$

$$(\alpha-\beta)_k = (1-a)(\alpha-\beta)_{k-1} + ar_k \quad \text{Equation 10}$$

where $r_k$ is input to filter 620 or 630 according to switch control 610.

For simplicity, consider an example with a filter coefficient, a, equal to 1, in which case α+β estimate 620 and α−β estimate 630 are simply registers. With this example, it can be seen that the most recent incoming symbol $r_k$ is always used in calculating the estimates α and β. These effects are summarized in Table 2.

TABLE 2

| k | Symbols Used | Symbol Ages | Average Age |
|---|---|---|---|
| 1 | r0, r1 | 1, 0 | 0.5 |
| 2 | r0, r2 | 2, 0 | 1.0 |
| 3 | r3, r2 | 0, 1 | 0.5 |
| 4 | r4, r2 | 0, 2 | 1.0 |
| 5 | r4, r5 | 1, 0 | 0.5 |
| ... | ... | ... | ... |

In similar fashion as Table 1, the first column in Table 2 shows the symbol index, k. The second column indicates which two most recent received symbols are included in the filter calculation. Column three indicates the ages, in number of symbols, of those symbols. Column four shows the average age of the two most recent symbols. As stated above, those of skill in the art will recognize that the accuracy of the estimates can be increased with decreasing average age of the symbols used in the estimation. In comparison with the age effects described with relation to Table 1, which showed the average age of the symbols between 0.5 and 1.5, this embodiment has average ages between 0.5 and 1.0. During symbols where k is odd, the performance of the two embodiments is identical. During symbols where k is even, this embodiment sees the benefit of using the most recently received symbol.

Figure 8:
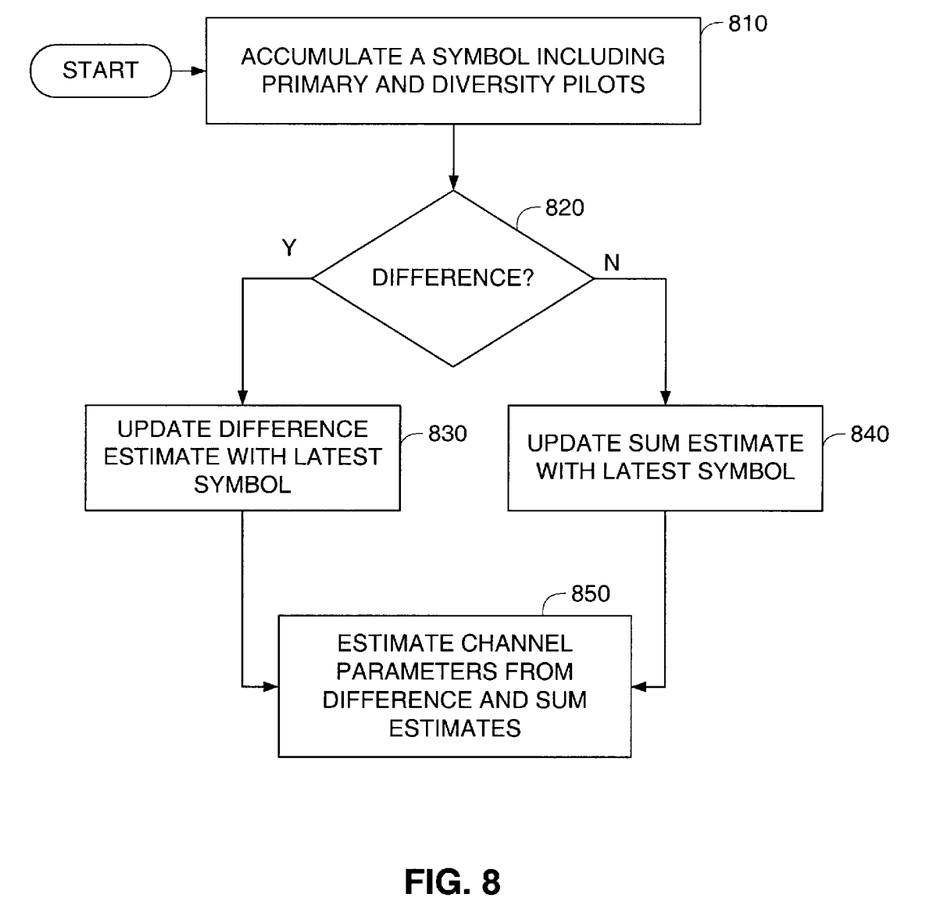
FIG. 8 depicts a flowchart of an embodiment of a method for estimating channel parameters using the most recently received symbols.

FIG. 8 depicts a flowchart of an embodiment of a method for estimating channel parameters using the most recently received symbols. The process starts in step 810, in which a symbol including the primary and diversity pilot symbols is correlated and accumulated. Proceed to decision block 820. In decision block 820, if the symbol contains the difference between the primary and diversity pilots, proceed to step 830 and update the difference estimate with the latest symbol. In the exemplary embodiment described in FIG. 6, decision block 820 can be implemented using switch control 610 and switches 612 and 614. Activating switch 614 updates the α−β estimate in α−β estimate 630. In decision block 820, if the symbol does not contain the difference, but rather the sum of the primary and diversity pilots, proceed to step 840 and update the sum estimate with the latest symbol. In the exemplary embodiment described in FIG. 6, activating switch 612 updates the α+β estimate in α+β estimate 620. From either step 830 or 840, proceed to step 850 and estimate the channel parameters from the difference and sum estimates. In the exemplary embodiment of FIG. 6, step 850 can be implemented using parameter estimation block 640, an example of which is detailed in FIG. 7.

Note that the foregoing discussion has used the signals, codes and parameters defined in the W-CDMA standard as some of the exemplary signals, codes and parameters. This is for clarity of discussion only, and should not be construed to limit the scope of the present invention to W-CDMA systems. The principles of the present invention apply to any conceivable system that employs an orthogonalizing sequence to generate primary and diversity pilots with the properties described. Various combinations of pilot and data encoding schemes for diversity transmission with antenna verification are anticipated and fall within the scope of the present invention. Those skilled in the art will recognize how to adapt the various embodiments described for use with such alternate systems.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
   a sum estimator for producing an estimate of the sum of a primary channel and a diversity channel in response to a received symbol;
   a difference estimator for producing an estimate of the difference of the primary channel and the diversity channel in response to a received symbol;
   a controller for updating the sum estimator when the received symbol comprises a sum of the primary and diversity channels and for updating the difference estimator when the received symbol comprises a difference of the primary and diversity channels; and
   a parameter estimator for producing a primary channel estimate and a diversity channel estimate from the estimate of the sum and the estimate of the difference of the primary and diversity channels.

2. The apparatus of claim 1, further comprising:
   a despreader for despreading received samples with a pilot sequence to produce despread samples; and
   an accumulator for accumulating the despread samples for a symbol period to produce the received symbol.

3. The apparatus of claim 1, wherein the sum estimator is a filter.

4. The apparatus of claim 1, wherein the difference estimator is a filter.

5. The apparatus of claim 1, wherein the sum estimator is a register.

6. The apparatus of claim 1, wherein the difference estimator is a register.

7. The apparatus of claim 1, wherein:
   the parameter estimator produces the primary channel estimate by adding the estimate of the sum with the estimate of the difference; and
   the parameter estimator produces the diversity channel estimate by subtracting the estimate of the difference from the estimate of the sum.

8. A wireless communication device, comprising:
   a sum estimator for producing an estimate of the sum of a primary channel and a diversity channel in response to a received symbol;
   a difference estimator for producing an estimate of the difference of the primary channel and the diversity channel in response to a received symbol;
   a controller for updating the sum estimator when the received symbol comprises a sum of the primary and diversity channels and for updating the difference estimator when the received symbol comprises a difference of the primary and diversity channels; and
   a parameter estimator for producing a primary channel estimate and a diversity channel estimate from the estimate of the sum and the estimate of the difference of the primary and diversity channels.

9. A communication system, comprising:
   a sum estimator for producing an estimate of the sum of a primary channel and a diversity channel in response to a received symbol;
   a difference estimator for producing an estimate of the difference of the primary channel and the diversity channel in response to a received symbol;
   a controller for updating the sum estimator when the received symbol comprises a sum of the primary and diversity channels and for updating the difference estimator when the received symbol comprises a difference of the primary and diversity channels; and
   a parameter estimator for producing a primary channel estimate and a diversity channel estimate from the estimate of the sum and the estimate of the difference of the primary and diversity channels.

10. An apparatus, operable with a base station configured for transmit diversity, the base station transmitting a first pilot sequence on a first antenna and a second pilot sequence on a second antenna, the second sequence generated by multiplying each symbol of the first pilot sequence by a value from an orthogonalizing sequence, the symbols consisting of a pre-determined number of chips, comprising:
    a despreader for despreading received samples with the first pilot sequence;
    an accumulator for accumulating the pre-determined number of despread samples to produce a received symbol;
    a first filter for filtering received symbols when the current value of the orthogonalizing sequence is positive;
    a second filter for filtering received symbols when the current value of the orthogonalizing sequence is negative; and
    a parameter estimator for generating a primary channel estimate and a diversity channel estimate from the output of the first and second filters.

11. A method of channel estimation for use in a transmit diversity communication system, comprising:
    producing a difference estimate with a most recently received symbol when the symbol comprises a difference between the primary and diversity channels;
    producing a sum estimate with a most recently received symbol when the symbol comprises a sum of the primary and diversity channels;
    producing a primary channel estimate from the difference estimate and the sum estimate; and
    producing a diversity channel estimate from the difference estimate and the sum estimate.

12. The method of claim 11, further comprising:
correlating received samples with a primary pilot sequence to produce despread samples; and
accumulating the despread samples for a symbol period to produce a received symbol.

13. The method of claim 11, further comprising demodulating received symbols in response to the primary channel estimate and the diversity channel estimate.

14. The method of claim 11, wherein producing the difference estimate comprises filtering the received symbols.

15. The method of claim 11, wherein producing the sum estimate comprises filtering the received symbols.

16. The method of claim 11, wherein producing the primary channel estimate comprises adding the sum estimate to the difference estimate.

17. The method of claim 11, wherein producing the diversity channel estimate comprises subtracting the difference estimate from the sum estimate.

18. A method of channel estimation, suitable for use in a transmit diversity communication system, including a base station transmitting a first pilot sequence on a first antenna and a second pilot sequence on a second antenna, the second sequence generated by multiplying each symbol of the first pilot sequence by a value from an orthogonalizing sequence, the symbols consisting of a pre-determined number of chips, the method comprising:
filtering a current received symbol when the current value of the orthogonalizing sequence is positive to produce a sum estimate;
filtering a current received symbol when the current value of the orthogonalizing sequence is negative to produce a difference estimate; and
generating a primary channel estimate and a diversity channel estimate from the sum estimate and the difference estimate.

19. An apparatus, comprising:
means for producing a difference estimate with a most recently received symbol when the symbol comprises a difference between the primary and diversity channels;
means for producing a sum estimate with a most recently received symbol when the symbol comprises a sum of the primary and diversity channels;
means for producing a primary channel estimate from the difference estimate and the sum estimate; and
means for producing a diversity channel estimate from the difference estimate and the sum estimate.

20. A wireless communication device, comprising:
means for producing a difference estimate with a most recently received symbol when the symbol comprises a difference between the primary and diversity channels;
means for producing a sum estimate with a most recently received symbol when the symbol comprises a sum of the primary and diversity channels;
means for producing a primary channel estimate from the difference estimate and the sum estimate; and
means for producing a diversity channel estimate from the difference estimate and the sum estimate.

21. A communication system, comprising:
means for producing a difference estimate with a most recently received symbol when the symbol comprises a difference between the primary and diversity channels;
means for producing a sum estimate with a most recently received symbol when the symbol comprises a sum of the primary and diversity channels;
means for producing a primary channel estimate from the difference estimate and the sum estimate; and
means for producing a diversity channel estimate from the difference estimate and the sum estimate.

22. An apparatus, operable with a base station configured for transmit diversity, the base station transmitting a first pilot sequence on a first antenna and a second pilot sequence on a second antenna, the second sequence generated by multiplying each symbol of the first pilot sequence by a value from an orthogonalizing sequence, the symbols consisting of a pre-determined number of chips, comprising:
a means for filtering a current received symbol when the current value of the orthogonalizing sequence is positive to produce a sum estimate;
a means for filtering a current received symbol when the current value of the orthogonalizing sequence is negative to produce a difference estimate; and
a means for generating a primary channel estimate and a diversity channel estimate from the sum estimate and the difference estimate.

23. Processor readable media operable to perform the following steps:
producing a difference estimate with a most recently received symbol when the symbol comprises a difference between the primary and diversity channels;
producing a sum estimate with a most recently received symbol when the symbol comprises a sum of the primary and diversity channels;
producing a primary channel estimate from the difference estimate and the sum estimate; and
producing a diversity channel estimate from the difference estimate and the sum estimate.

24. Processor readable media, operable with a base station transmitting a first pilot sequence on a first antenna and a second pilot sequence on a second antenna, the second sequence generated by multiplying each symbol of the first pilot sequence by a value from an orthogonalizing sequence, the symbols consisting of a pre-determined number of chips, the media operable to perform the following steps:
filtering a current received symbol when the current value of the orthogonalizing sequence is positive to produce a sum estimate;
filtering a current received symbol when the current value of the orthogonalizing sequence is negative to produce a difference estimate; and
generating a primary channel estimate and a diversity channel estimate from the sum estimate and the difference estimate.

* * * * *